March 31, 1925.　　　　　　　　　　　　　　　　1,531,975
A. W. REYNOLDS
WEEDER
Filed Jan. 2, 1923　　　　　2 Sheets-Sheet 1

Inventor
Arthur W. Reynolds

Chamberlain & Newman
Attorneys

March 31. 1925.

A. W. REYNOLDS

WEEDER

Filed Jan. 2, 1923

Inventor

Arthur W. Reynolds

By

Chamberlain & Newman Attorneys

Patented Mar. 31, 1925.

1,531,975

UNITED STATES PATENT OFFICE.

ARTHUR W. REYNOLDS, OF NEWTOWN, CONNECTICUT.

WEEDER.

Application filed January 2, 1923. Serial No. 610,165.

*To all whom it may concern:*

Be it known that I, ARTHUR W. REYNOLDS, a citizen of the United States, and resident of Newtown, in the county of Fairfield and State of Connecticut, have invented certain new and useful Improvements in Weeders, of which the following is a specification.

The present invention relates to improvements in weeders, and particularly such an implement as the wide horse drawn riding type. A principal object of the invention is to provide a wide weeder which will be flexible and operate uniformly upon uneven ground, so that every portion of the ground may be worked.

Another object is to enable the weeder, which will be of relatively great expanse in use, to be contracted as to its width dimension as by folding, to permit the same to pass freely through gates and other narrow passages, and to allow for convenient storage in a small space when not in use, or when stored out of season.

Still another object is to provide a foot lift, by means of which the teeth may be quickly and easily lifted to inoperative position when desired for turning at the end of rows, and in which the teeth supporting frame will be held in lifted position uniformly horizontal along its length, so that one end will not drag the ground, thereby scratching out seed on the turns, as has been the case with previous constructions.

With the above and other objects in view, an embodiment of the invention is illustrated in the accompanying drawings, and this embodiment will be hereinafter more fully described with reference thereto, and the invention will be finally pointed out in the claims.

In the drawings:—

Similar reference characters indicate corresponding parts throughout the several figures of the drawings.

Figure 1:
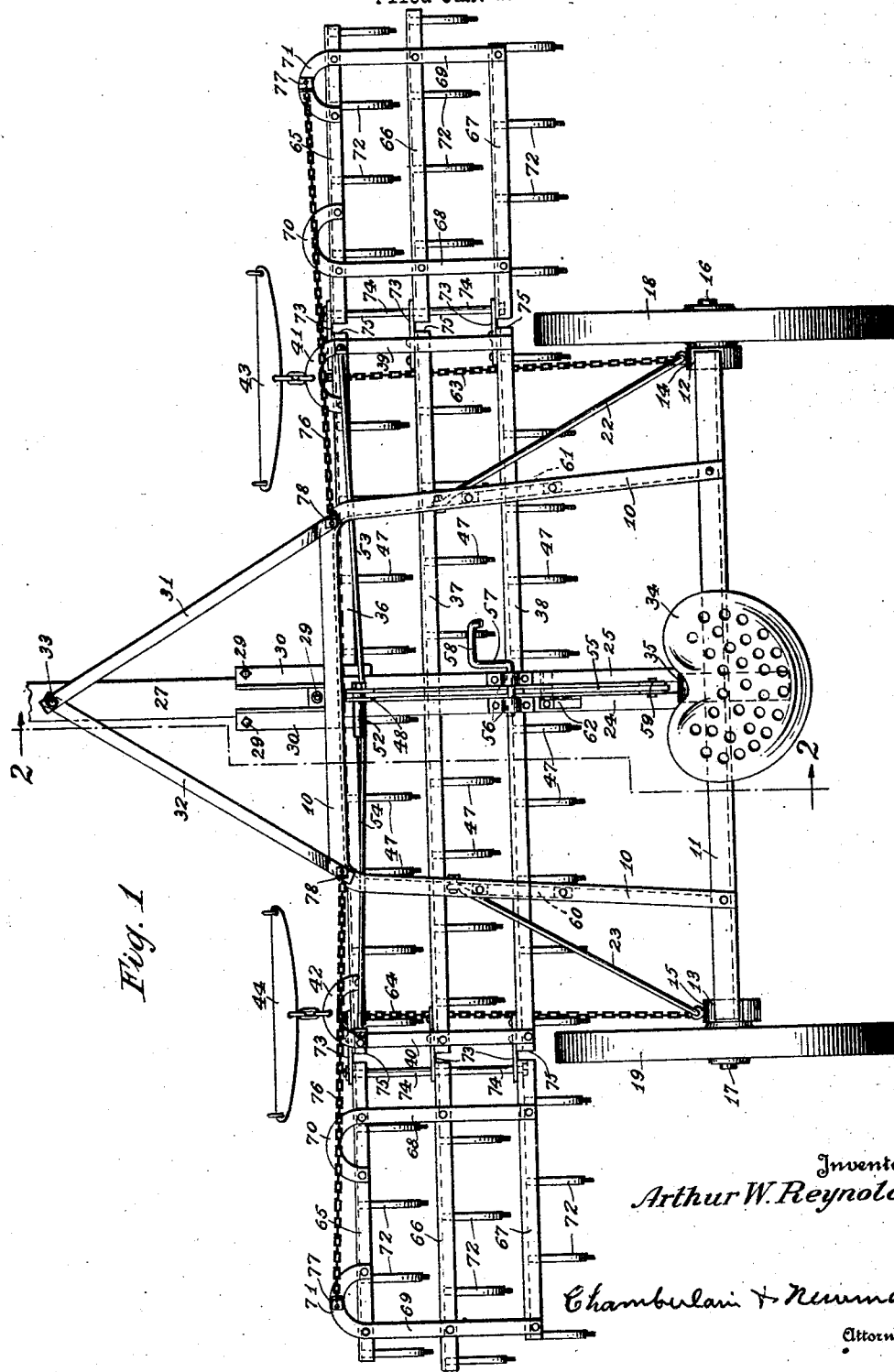
Fig. 1 is a plan view of a weeder in accordance with the present embodiment of the invention.

Referring to the drawings, the weeder comprises a main frame preferably formed of angle iron and consisting of a U-shaped horizontal upper member 10, having a front and side portions, and connected at the rear ends of the side portions to a transverse bar 11, the ends of which extend beyond the member 10.

Vertical standards 12 and 13, each formed of a pair of angle bars, are secured at their upper ends to the respective ends of the bar 11, and are shaped at their lower ends, as at 14 and 15, to provide bearings for the axles 16 and 17 of the wheels 18 and 19. Miter braces 20 and 21 are provided in the corners between the bar 11 and the standards 12 and 13, to brace the latter, while brace rods 22 and 23 are connected between the lower ends of the standards and the sides of the member 10 to firmly brace the frame.

Horizontal guideways 24 formed of a pair of spaced angle bars, to form a channel therebetween, extend beneath the member 10, and are supported at their front and rear ends by means of hangers 25 and 26 respectively connected at their upper ends to the front portion of the member 10 and the bar 11.

A forwardly extending pole 27 is connected by a stirrup 28 and suitable bolts 29 to angle pieces 30 secured to the guideways 24, and is braced by means of diagonally disposed strut bars 31 and 32, connected at their rear and spaced ends to the member 10, and at their forward meeting ends to a bolt 33.

The driver's seat 34 is provided at the rear of the frame, and is supported upon a spring support 35 secured to the rear end of the guideways 24.

The weeder frame comprises an intermediate and end sections, the latter normally extending beyond the wheels 18 and 19. The intermediate section consists of a plurality of spaced parallel angle bars 36, 37 and 38 connected together adjacent their ends by braces 39 and 40, bent into hook shape at their forward ends, as at 41 and 42, and projecting forwardly of the bar 36 to form supports for the whiffletrees 43 and 44, which are connected thereto. The bars are connected at their centers by a pair of spaced angle bars 45 and 46, providing a channel between their upright portions which the draw bar and lift bar pass through, the angle bars being bent downwardly and rearwardly from the rear bar 38. A series of weeder teeth 47 are secured to and carried by the bars 36, 37 and 38 in staggered relation.

An adjustable vertically disposed draw bar 48 for the weeder frame is disposed in the channel of the guideways 24, and is supported therein by means of a key pin 49 engaged in one of a series of spaced holes 50 in the draw bar. The lower end of the draw bar extends through the channel between the bars 45 and 46 of the weeder frame, and pivotally supports the forward portion of the weeder frame and is braced beneath the said bars by brace 55 as at 51, the upper end of the brace being bolted between the horizontal portions of the bars 45 and 46. A handle 52 is provided at the upper end of the support 48 to enable the driver to lift the same for the purpose of relocating the position of the pin 49, to thereby regulate the operative position of the weeder frame and also hold the intermediate section up higher when going on the road. A pair of diagonal brace rods 53 and 54 are connected between the upper end of the draw-bar 48 and the forward outer ends of the weeder frame, for the purpose of stabilizing the frame and to cause it to maintain a substantially right angular relation with the support 48. The relation of the support 48 in the bar 24 is sufficiently flexible to permit the teeth of the weeder frame to follow the contour of the ground.

The lifting mechanism for the weeder frame comprises brackets 56 upon the guideways 24, pivotally supporting a bell-crank foot lever 57, provided at the end of its upper arm with a foot rest portion 58, accessible to the driver, and having its rear arm connected by a link 59, extending through the channel of the guideways 24, to the rearwardly projecting ends of the center brace bars 45 and 46 of the weeder frame.

In operation, the driver may raise or lower the weeder frame to any desired extent, through pressure upon the foot rest 58 of the foot lever. In the extreme raised position of the frame, it abuts a pair of U-shaped stop members 60 and 61 dependingly supported from the side portions of the member 10, and adapted to maintain the lever position of the frame when so raised, to thereby prevent digging of the teeth 47 into the ground at one side, as would be the case if the frame were allowed to tilt.

A pivoted dog 62 is provided on the guideways 24, and is adapted to be swung beneath the arm of the lever 57 to support the same when raised, for going on the road and between fields.

Loose draw chains 63 and 64 extend from the whiffletree 43 and 44 or near the ends of bar 36 to the lower ends of the standards 12 and 13, so that the pull of the horses will be, not only upon the weeder frame and the beam 27, but also upon the rear portion of the main frame adjacent the wheel axles if one horse walks faster or pulls harder than the other, especially when turning.

The end sections of the weeder frame are of similar construction, and each comprises parallel angle bars 65, 66 and 67 substantially in alignment with the bars 36, 37 and 38, and connected together by brace bars 68 and 69, bent into hook form at their forward ends, as at 70 and 71. Spaced weeder teeth 72 are secured to the bars 65, 66, and 67 in staggered relation. Extension strips 73 are secured to the outer ends of the bars of the intermediate section and are hingedly connected to the end portions of the bars 65, 66 and 67 by means of a shaft or long bolt 74. As indicated at the left in Fig. 3, the bars rest upon the set back ends 75 of the top horizontal portions of the bars 36, 37 and 38.

Draw chains 76 extending between a bracket or bolt 77 attached to the forward ends of braces 69 and hooks 78 secured to the frame 10, enable the driver to conveniently raise the end sections from the seat, one of the links of the chain near the bracket 77 being engaged with the hook in the raised positions of the end sections to prevent the same from accidentally falling to lowered position.

Figures 2, 3:
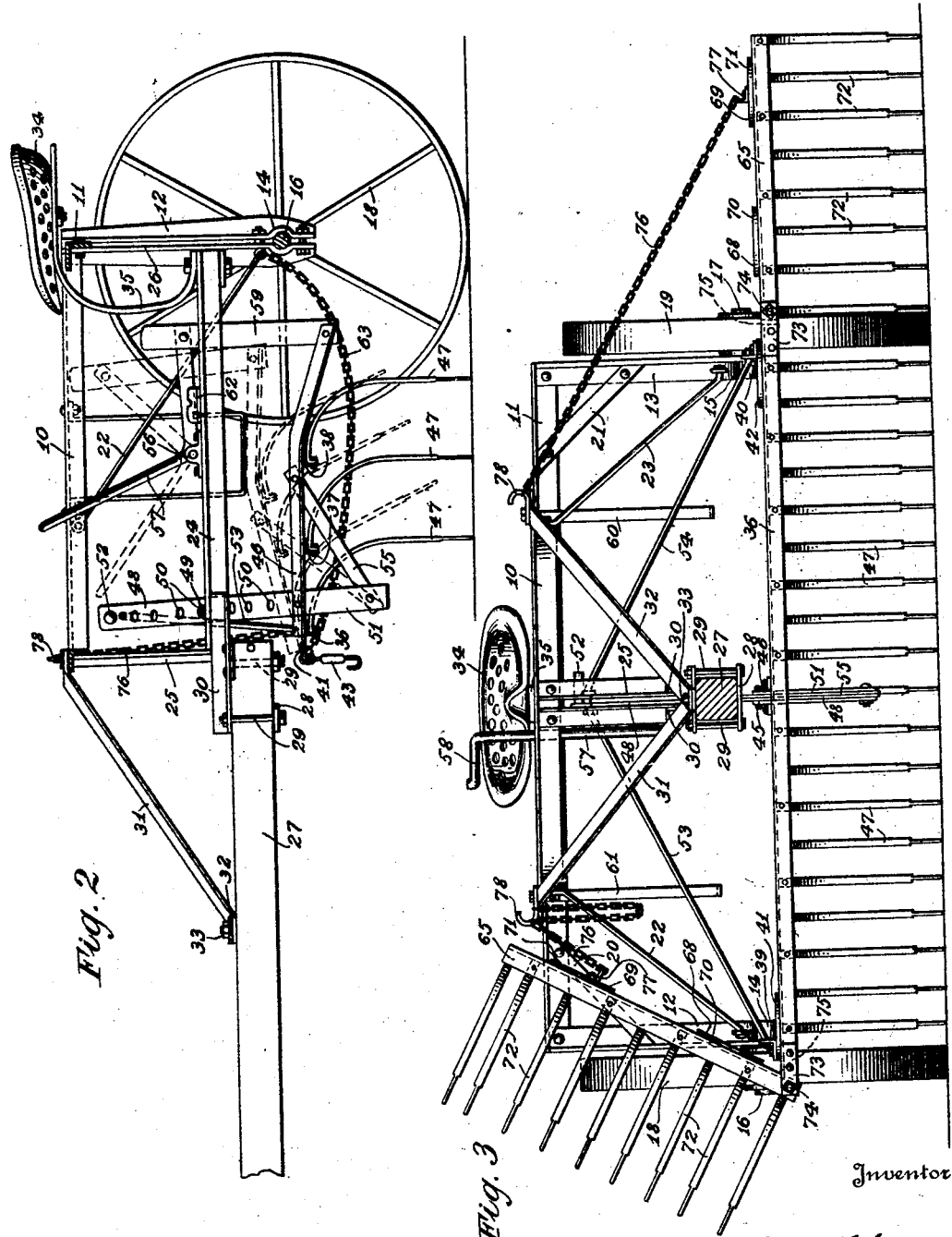
Fig. 2 is a longitudinal vertical sectional view along the line 2—2 of Fig. 1.
Fig. 3 is a front elevation showing the weeder section at the left end in folded position for going through gates, on the road, etc. and the weeder section at the other end in lowered operative position.

In the position when raised by the foot lever for turning in the field as shown by dotted lines in Fig. 2 which raises the teeth up and back, the end weeder sections are supported by the chains 76 and thereby maintained in a level or horizontal position with relation to the intermediate section.

Obviously these chains do not affect the flexibility of the weeder when working in the ground because if there is a depression under one of the end weeder sections, there will be an elevation under the intermediate section and the wheel, thereby loosening the chain sufficiently for the end section to follow the depression. The draught of the horses coming at the outer ends of the intermediate section has a tendency to pull the end sections into the ground too deep, especially when turning in the field with the weeder in operative position, and these chains which are adjustable in length, hold the end sections in the proper position.

With my improved machine a weeder is provided which will cover a relatively wide expanse of ground, and which will at all times closely follow the contour thereof. The weeder teeth may be set to any depth, at which it is desired to operate, and when turning or moving over a part of the ground, that it is not desired to work, may be conveniently raised by pressure of the foot of the driver. When in this raised position the weeder frame will be maintained in a level position, so that all teeth will be out of engagement with the ground. When passing through gates, or other narrow passages, or when the machine is stored, the end weeder sections may be drawn up into their inoperative raised positions without requiring the driver to leave his seat. In the raised position of the end sections the weeder frame may still be operated as to the intermediate section, or if desired only one of the end sections may be lowered to operative position.

I have illustrated and described a preferred and satisfactory embodiment of the invention, but it is obvious that changes may be made therein within the spirit and scope thereof, as defined in the appended claims.

I claim:—

1. In a weeder of the character described, a main frame having wheels, a ground-working teeth-supporting frame disposed in a substantially horizontal plane, means pivotally supporting the teeth-supporting frame substantially centrally of the main frame, and entirely forwardly of the axis of the wheels means connected to the teeth-supporting frame centrally and at a point rearwardly of the supporting means and adapted to be operated to lift it, and a pair of stop members fixedly supported on the main frame at each side of the center and spaced from the teeth-supporting frame in its lowered position, and adapted to be engaged by the teeth supporting frame when lifted to maintain it in a level position.

2. In a weeder of the character described, a main frame having wheels, a ground-working teeth-supporting frame disposed in substantially horizontal plane, a center-bar on the main frame, a vertically adjustable support for the teeth-supporting frame connected to the center bar and pivotally supporting the teeth-supporting frame at its center, rigid brace rods extending from said support to the ends of the teeth-supporting frame, and adapted to maintain it in a right angular position with respect to said support, and means adapted to be operated to lift the teeth-supporting frame about its pivotal support.

3. In a weeder of the character described, a main frame having wheels, a ground-working teeth-supporting frame disposed in a substantially horizontal plane, a foot lever pivotally mounted on the main frame and connected to the teeth-supporting frame and adapted to be operated to lift the teeth-supporting frame, and a dog pivotally mounted about a vertical axis and adapted to be moved laterally into variable relation with said foot lever to engage the same at different distances from the pivot of the foot lever to maintain the frame in any position to which it is lifted.

Signed in the county of Fairfield and State of Connecticut this 30th day of Dec. A. D., 1922.

ARTHUR W. REYNOLDS.

Witnesses:
LILLIAN M. ALLING,
ELBERT O. HULL.